Dec. 14, 1948.                L. M. PATRICK                2,456,212
                                REGULATOR
                            Filed May 13, 1946

INVENTOR
LAWRENCE M. PATRICK
BY Raymond H. Vernes
ATTORNEY

Patented Dec. 14, 1948

2,456,212

UNITED STATES PATENT OFFICE 2,456,212

REGULATOR

Lawrence M. Patrick, Detroit, Mich., assignor of one-third to Arthur A. Locke and one-third to Raymond F. Ternes, both of Detroit, Mich.

Application May 13, 1946, Serial No. 669,229

9 Claims. (Cl. 200—56)

This invention relates to regulators and, in particular, it relates to regulators adapted for association with the hand on dial gauges.

In general, this invention relates to a device for association with dial guages for the purpose of cooperating with the hand of the dial gauge to permit automatic regulation and control of the energy recorded by the gauge. Instead of functioning as an automatic means for regulating, the device may also be used as a means for effecting the signals upon either a rise or lowering of the registering hand in accordance with predetermined limitations.

In many cases it is desirable to maintain uniformity of dial readings on gauges. This is sometimes accomplished by valve mechanisms, thermostats, and the like. In some cases it is difficult to provide a regulating arrangement which will function to maintain close uniformity in the dial reading. According to the present invention I provide a sensitive device easily operated which may be adapted for association with a dial gauge in such manner that a portion of the device functions cooperatively with movement of the hand of the gauge resulting in the closing of an electrical circuit. This circuit is connected with conventional relays and other power operable devices which function to either increase or decrease the dial reading.

A device of the present description functions independently of the type of gauge with which it is associated. For example, the gauge may be used for recording steam or air pressures, vacuum, temperatures, or fluid velocities. Also, the gauges may be in the form of those instruments in the class of tachometers. Because of the adaptability of the device to any tape of such gauge, it is possible to provide accurate control for any system using such a gauge without the necessity of depending upon a secondary control or adjustable means which is foreign to the principal indicating gauge. In other words, since the gauge itself represents the prime means for indicating the gauge reading, it is obviously the most effective location for controlling the limitations of the gauge reading.

It is therefore among the objects of my invention to provide a control for a dial gauge which will function easily and effectively upon contact engagement with the dial hand; to provide such a device which is adjustable throughout the range of the dial reading; to provide such a device which is readily adaptable for association with a dial gauge without impairing the function of the gauge; and, to provide such a device which is simple in construction, economical of manufacture, and efficient in operation. These and other objects and advantages will appear more fully in the following detailed description when considered in connection with the accompanying drawing, in which Figure 1 is a front elevational view of a dial gauge with which the device of my invention is associated;

Figure 1:
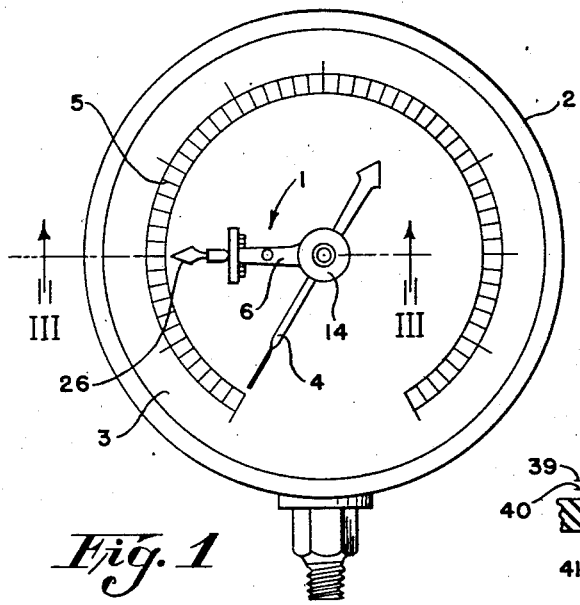
Figure 5:
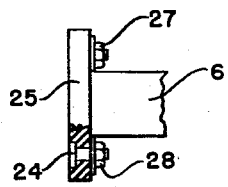
Figure 5 is a detail view, partly in section, of a portion of the control device taken along lines V—V of Figure 3.
Figure 2:
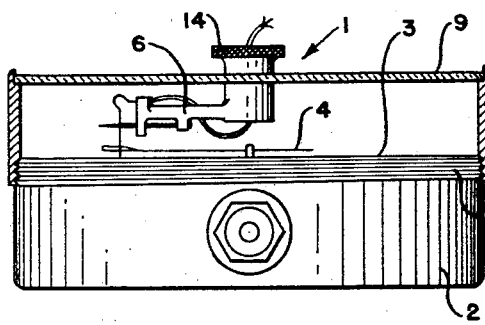
Figure 2 is an elevational view thereof, partly in section.
Figure 7:
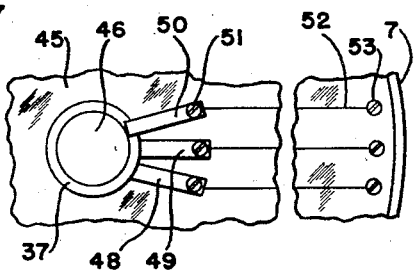
Figure 7 is a partial plan view thereof.

With reference to the drawing and in particular to Figures 1 and 2, I show an embodiment of my invention in the form of a control device 1 associated with a conventional gauge 2 having a dial 3 and a hand 4. The dial 3 is provided with subdivisions 5 in accordance with the conventional practice of gauges of this type. The gauge, as illustrated, is of a type characteristic of steam gauges, air pressure gauges, or the like. The control device 1 consists essentially of an arm portion 6 pivotally mounted in axial alignment with the hand 4 of the gauge. In order to maintain the arm 6 in such a relationship, an extension collar 7 is associated with threads 8 of the gauge for supporting a glass or plastic face 9 over the dial area. The extension collar 7 permits a greater space between the glass 9 and the dial 3 for the purpose of interposing the control regulator therebetween.

Figure 3:
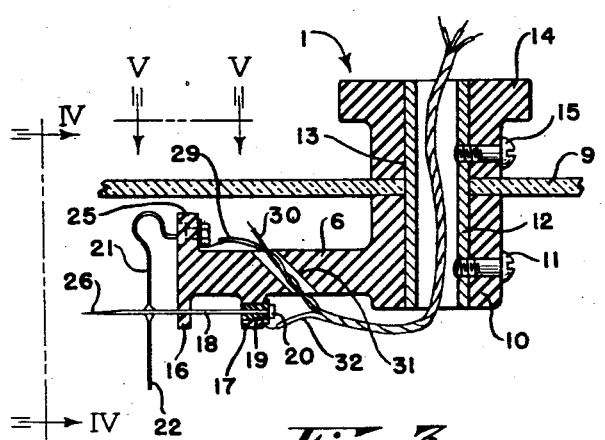
Figure 3 is an enlarged detail view, in section, of the device of my invention, taken along lines III—III of Figure 1.
Figure 4:
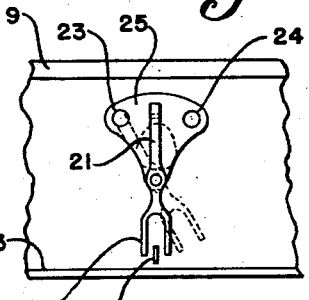
Figure 4 is an end view of the regulating device taken along lines IV—IV of Figure 3.

As shown in Figure 3, the arm 6 which is formed of plastic material or other electrically insulating material, is provided with a hub portion 10 to which is attached, by means of a screw 11, a metal tube 12. This tube 12 is coaxial with the pivot of the hand 4 and extends through an aperture 13 in the glass disc 9. On the opposite side of the glass disc 9 is a manually operated knob 14 also attached to the tube 12 by means of a screw 15. By this arrangement it is possible to move the arm 6 in an arcuate path by manually manipulating the knob 14.

Associated with the underside of the arm 6 are projections 16 and 17. These projections serve as a bearing support for a pin 18 which is rotatably mounted within the projections. Preferably, with the projection 17 is associated a metallic bushing 19 for the purpose hereinafter described. The end of the pin 18 adjacent to the bushing 19 is provided with a head 20 in order to limit its axial movement. Near the opposite end of the pin 18 is attached a contact member 21 having a bifurcated arm 22 adapted to straddle the hand 4. The upper portion of the contact member 21 is shaped to provide a slight spring action for engagement with terminals 23 and 24 extending through a flange portion forming a part of the end of the arm 6. The outward end 26 of the pin 18 is flattened out and shaped so as to resemble an indicator needle or pointer which may be selectively aligned with the desired scale reading on the dial 3. The pin 18 and its associated contacting member 21, although being provided with a slight tension are delicately balanced and easily movable by the hand 4.

The contacting members 23 and 24 have their metal face flush with the face of the flange portion 25 and are positioned radially from the center of the pin 18 so as to lie in the path of the contact member 21. Associated with the contacting members 23 and 24 are nuts 27 and 28, respectively. Electric wires 29 and 30 are connected with the contacting members 23 and 24 and pass through an opening 31 through the arm 6. A third wire 32 is attached to the bushing 19, and with the wires 29 and 30 extend through the opening in the tube 12 and outwardly from the gauge to a relay or other electrical instrument for regulating the proper gauge reading. The wire 32 connects with the bushing 19 to permit the completion of an electrical circuit from the bushing to the pin 18, contact member 21, and selectively to either the contact terminals 23 or 24.

In the operation of the regulating device the pointer 26 is manually moved to the desired dial reading at which uniformity of operation is desired. Normally, the bifurcated arm 22 is in a position so that the hand 4 will enter between the prongs of the bifurcated arm. Thereafter, as the hand 4 increases its movement the hand will press against the bifurcated arm and may continue its movement until contact is made with the opposite terminal, such as 24. When this condition occurs the circuit is completed which, through relays and other mechanisms, functions to reduce the cause of the increased dial reading, after which the hand will recede and move the contact member out of engagement with the terminal. In the event the dial reading drops, contact is made with the opposite terminal 23 and again a circuit is completed to activate the source to increase the dial reading. This operation will continue whenever the hand 4 reaches beyond predetermined limitations while always maintaining a tendency to retain the hand 4 in a neutral position in direct alignment with the pointer 26.

Figure 6:
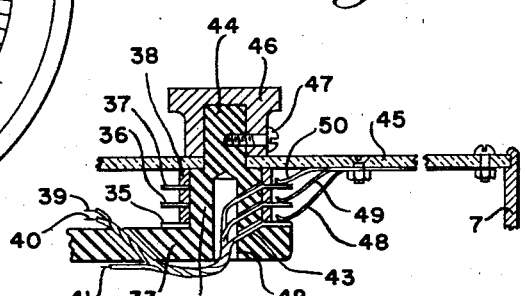
Figure 6 is an enlarged detail view, in section, of a modified form of the invention.

Figure 6 illustrates a modification of the invention which is similar in principle to that disclosed in relation with Figure 3, except that a different method of associating the electrical wires thereto is provided. In this modification, an arm 33 is provided with a hub portion 34 over which is located a plurality of metal washer-like contact members 35, 36 and 37. These contact members are separated by spacer members 38 of electrically insulating material. The arm 33 and connecting hub 34 are also formed of a plastic or other electrically insulating material. Electrical wires 39, 40 and 41 corresponding to the wires 29, 30 and 32, respectively, of the modification shown in Figure 3 are connected one each to the contact members 35, 36 and 37 by being soldered thereto. A central aperture 42 in the hub 34, and additional apertures 43 extending through the wall of the hub 34, permits wires to be associated with the contact disc members.

A projection 44 extending from the hub 34 passes through a central opening in a transparent plastic disc 45. This plastic disc 45 corresponds with the disc 9 in the principal modification of the invention. A hand operating knob 46 fits over the projection 44 and is attached thereto by means of a screw 47 which maintains the arm 33 in a movable position relative to the disc 45.

Contact spring arms 48, 49 and 50 are secured to the disc 45 by means of screws 51 and are adaptable for sliding contact engagement with the contact discs 35, 36, and 37, respectively. Electrical wires 52 engage with the screws 51 and with terminals 53 located near the outer edge of the transparent disc 45.

By this arrangement it is possible to manually move the arm 33 to its pivot point and throughout a 360° movement without the inconvenience of projecting wires. In the present modification it is merely necessary to connect additional wires to the terminals 53 for the purpose of communicating with the source of electrical energy, relays, and such other conventional mechanism as may be required to effect the proper reaction in accordance with the position of the electrical contacts as contained on the arm 33, and as shown more particularly in the principal embodiment illustrated by Figure 3.

As thus shown and described, it is believed apparent that I have provided a unique adaptor for association with dial gauges which may be readily affixed thereto without impairment of the gauge and which will operate efficiently and effectively for the purpose stated.

While I have shown a preferred embodiment of my invention it is to be understood that it is susceptible of those modifications which appear obviously within the spirit of my invention and as appearing in the scope of the appended claims.

Having thus described my invention, what I claim and desire to protect by Letters Patent is:

1. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, and a pin mounted on the arm and extending radially of the arm to form a pivot for the contact member, said contact member being movable by the hand for selectively completing an electrical circuit.

2. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, a pin mounted on the arm and extending radially of the arm to form a pivot for the contact member, and a bifurcated arm extending transversely of the pin and adapted to straddle the hand and be moved by the hand, said contact member being connected with the bifurcated arm for selectively completing an electrical circuit.

3. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, a pin mounted on the arm and extending radially of the arm to form a pivot for the contact member, and a bifurcated arm extending transversely of the pin and adapted to straddle the hand and be moved by the hand, said contact member forming a spring tension member extending from the bifurcated arm for selectively completing an electrical circuit.

4. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, a pin mounted on the arm and extending radially of the arm to form a pivot for the contact member, a bifurcated arm extending transversely of the pin and adapted to straddle the hand and be moved by the hand, and electrical contact terminals supported by the arm, said contact member forming a spring tension member extending from the bifurcated arm and adapted to engage the terminals.

5. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, a pin mounted on the arm and extending radially of the arm to form a pivot for the contact member, a bifurcated arm extending transversely of the pin and adapted to straddle the hand and be moved by the hand, and a flange portion extending from the outer end of the arm, electrical contact terminals supported by the flange, said contact member forming a spring tension member extending from the bifurcated arm and adapted to engage the terminals.

6. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, a pin mounted on the arm and extending radially of the arm to form a pivot for the contact member, a bifurcated arm extending transversely of the pin and adapted to straddle the hand and be moved by the hand, electrical contact terminals supported by the arm, said contact member forming a spring tension member extending from the bifurcated arm and adapted to engage the terminals, an electrical wire extending from each terminal, and an additional electrical wire contacting with said pin.

7. In combination with a dial gauge having a pivoted hand, a transparent plate positioned axially of the gauge and in spaced relation with the face of the gauge, an arm pivotally positioned in axial alignment with the pivot of the hand, means joining the arm and extending through the plate, means on the opposite side of the plate for manually moving the arm, a contact member, a pin mounted on the arm and extending radially of the arm to form a pivot for the contact member, a bifurcated arm extending transversely of the pin and adapted to straddle the hand and be moved by the hand, electrical contact terminals supported by the arm, said contact member forming a spring tension member extending from the bifurcated arm and adapted to engage the terminals, an electrical wire extending from each terminal, and an additional electrical wire contacting with said pin, said arm having an aperture extending axially therethrough for the passage of said wires through said aperture and through said manual means for moving said arm.

8. In combination with a dial gauge having a pivoted hand, a transparent plate positioned axially of the gauge and in spaced relation with the face of the gauge, an arm pivotally positioned in axial alignment with the pivot of the hand, a hub forming a part of the arm, means joining the arm and extending through the plate, means on the opposite side of the plate for manually moving the arm, a contact member, a pin mounted on the arm and extending radially of the arm to form a pivot for the contact member, electrical contacts supported by the arm and engageable with the contact member, electrical contact rings positioned concentric with the hub of the arm, wires joining the contacts with the contact rings, and spring contact means supported by the plate for sliding contact engagement with the contact rings.

9. In combination with a dial gauge having a pivoted hand, a transparent plate positioned axially of the gauge and in spaced relation with the face of the gauge, an arm pivotally positioned in axial alignment with the pivot of the hand, a hub forming a part of the arm, means joining the arm and extending through the plate, means on the opposite side of the plate for manually moving the arm, a contact member, a pin mounted on the arm and extending radially of the arm to form a pivot for the contact member, electrical contacts supported by the arm and engageable with the contact member, electrical contact rings positioned concentric with the hub of the arm, spring contact means supported by the plate for sliding contact engagement with the contact rings, and electrical terminals positioned near the outer edge of the transparent plate, and wires located on the underside of the plate and joining the terminals with the spring contact means.

LAWRENCE M. PATRICK.

REFERENCES CITED

The following references are of record in the file of this patent:

UNITED STATES PATENTS

| Number | Name | Date |
| --- | --- | --- |
| 223,068 | Shaw | Dec. 30, 1879 |
| 1,362,299 | Hall | Dec. 14, 1920 |